US011243893B2

(12) United States Patent
Lutz et al.

(10) Patent No.: US 11,243,893 B2
(45) Date of Patent: Feb. 8, 2022

(54) PREVENTING UNAUTHORIZED ACCESS TO ENCRYPTED MEMORY

(71) Applicant: Intel Corporation, Santa Clara, CA (US)

(72) Inventors: Jonathan Lutz, Cornelius, OR (US); Reouven Elbaz, Hillsboro, OR (US); Jason W. Brandt, Austin, TX (US); Hisham Shafi, Akko (IL); Ittai Anati, Ramat Hasharon (IL); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 406 days.

(21) Appl. No.: 15/977,353

(22) Filed: May 11, 2018

(65) Prior Publication Data

US 2019/0347213 A1 Nov. 14, 2019

(51) Int. Cl.
| | |
|---|---|
| *G06F 12/14* | (2006.01) |
| *G06F 21/60* | (2013.01) |
| *G06F 21/78* | (2013.01) |
| *G06F 11/36* | (2006.01) |
| *H04L 9/08* | (2006.01) |
| *G06F 9/38* | (2018.01) |

(52) U.S. Cl.
CPC ...... *G06F 12/1408* (2013.01); *G06F 11/3656* (2013.01); *G06F 21/602* (2013.01); *G06F 21/78* (2013.01); *H04L 9/0861* (2013.01); *G06F 9/384* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 9,202,060 | B2 * | 12/2015 | Geukes | G06F 21/575 |
| 9,902,060 | B2 * | 2/2018 | Inaba | H04W 76/25 |
| 2004/0255199 | A1 | 12/2004 | Yamashita | |
| 2010/0246813 | A1 * | 9/2010 | Morris | H04L 9/0656 |
| | | | | 380/28 |

(Continued)

OTHER PUBLICATIONS

Cheng et al., A Study of Main-Memory Hash joins on Many-Core Processor: A Case with Intel Knights Landing Architecture, 2017 CKIM'17, Singapore, pp. 657-666 (Year: 2017).*

(Continued)

*Primary Examiner* — Luu T Pham
*Assistant Examiner* — Edward X Long
(74) *Attorney, Agent, or Firm* — Nicholson De Vos Webster & Elliott, LLP

(57) ABSTRACT

A processor or system includes a processor core to execute a set of instructions to determine that a memory encryption mode is enabled. The memory encryption mode is to cause data stored to memory to be encrypted and data retrieved from the memory to be decrypted. The processor core is further to determine that a debug mode has been enabled and, responsive to a determination that the debug mode has been enabled, generate a second encryption key different than a first encryption key employed before reboot of a computing system. The processor core is further to transmit the second encryption key to a cryptographic engine for use in encryption and decryption of the data according to the memory encryption mode.

17 Claims, 11 Drawing Sheets

(56) References Cited

U.S. PATENT DOCUMENTS

| | | | |
|---|---|---|---|
| 2015/0006968 A1 | 1/2015 | ShanBhogue et al. | |
| 2016/0117265 A1* | 4/2016 | Mckeen ............. | G06F 12/1408 |
| | | | 711/102 |
| 2016/0179702 A1* | 6/2016 | Chhabra ............. | G06F 13/1605 |
| | | | 713/193 |
| 2017/0063532 A1 | 3/2017 | Bhattacharyya et al. | |
| 2017/0364684 A1* | 12/2017 | Lea ..................... | G06F 12/1027 |
| 2018/0006968 A1 | 1/2018 | Kutscher et al. | |

OTHER PUBLICATIONS

Zhou et al., Memory Management for Many-Core Processors with Software Configurable Locality Policies, 2012, ISMM'12, pp. 3-14 (Year: 2012).*

European Search Report for Application No. EP 19167714, 9 pages, dated Sep. 20, 2019.

\* cited by examiner

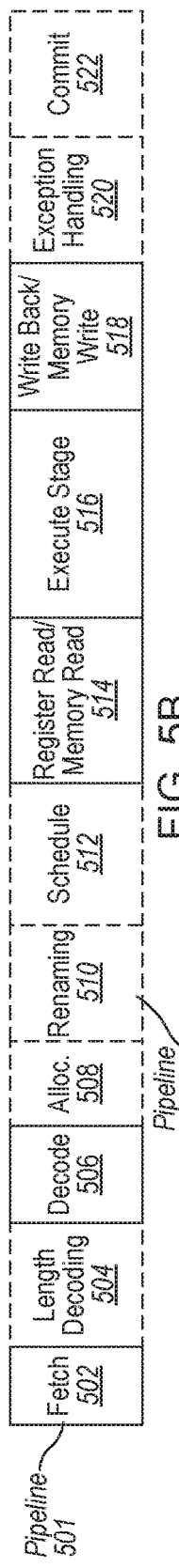
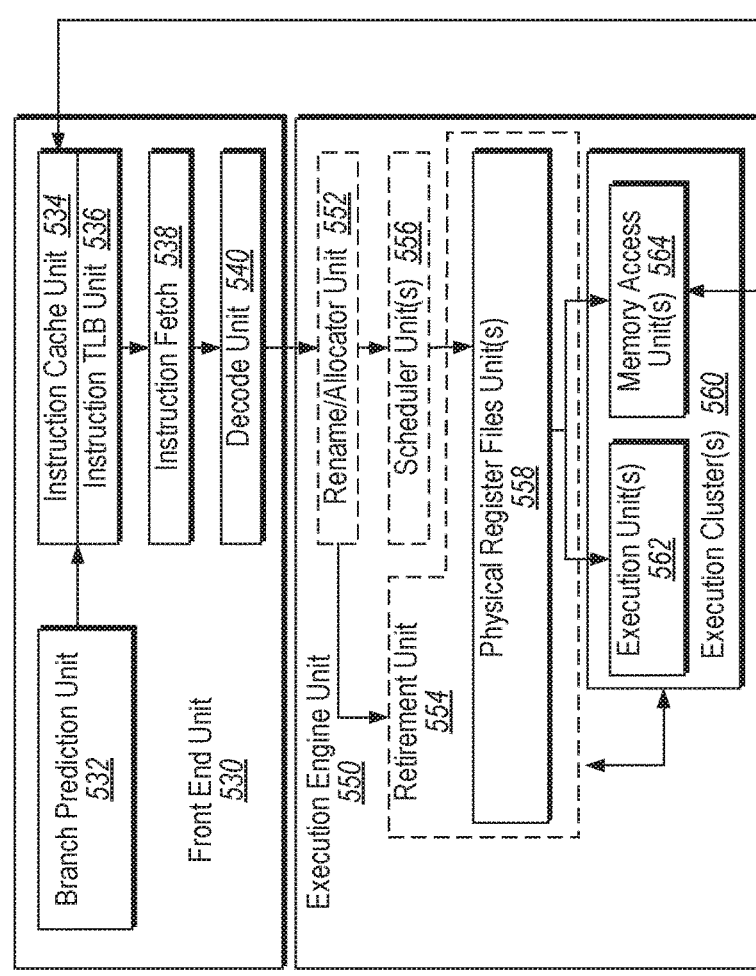
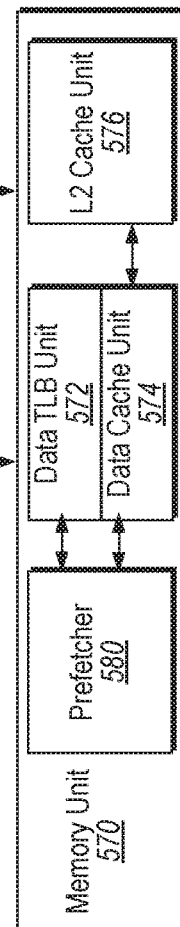
FIG. 5B
FIG. 5A

PREVENTING UNAUTHORIZED ACCESS TO ENCRYPTED MEMORY

TECHNICAL FIELD

The disclosure relates to protection of data stored in memory of a computer system, and more particularly, to preventing unauthorized access to encrypted memory.

BACKGROUND

Modern processors are designed to protect sensitive data in memory from both hardware and software attacks, and regions of memory so protected are referred to herein as protected memory. Some processors provide cryptographic mechanisms for encryption, integrity, and replay protection. Memory encryption protects the confidentiality of memory-resident data. On the other hand, integrity protection prevents an attacker from causing any hidden modifications to the cipher text (i.e., encrypted data, as opposed to plaintext which is unencrypted data) in memory, and replay protection eliminates any undetected temporal substitution of the cipher text. In the absence of such protections, an attacker with physical access to the system can record snapshots of data lines and replay them at a later point in time. In order to change the mode of memory protection management, a basic input-output system (BIOS) determines which mode to employ, and communicates that mode to an operating system upon boot of the computer system. A user of the computer system may also enable a debug mode via the BIOS during system restart or boot.

BRIEF DESCRIPTION OF THE DRAWINGS

FIG. 5A is a block diagram illustrating an in-order pipeline and a register renaming stage, out-of-order issue/execution pipeline according to one implementation.

FIG. 5B is a block diagram illustrating a micro-architecture for a processor or an integrated circuit that may that implement hardware support for static mode of protected memory management on flexibly-convertible enclave platform, according to an implementation of the disclosure.

DETAILED DESCRIPTION

Figure 1:
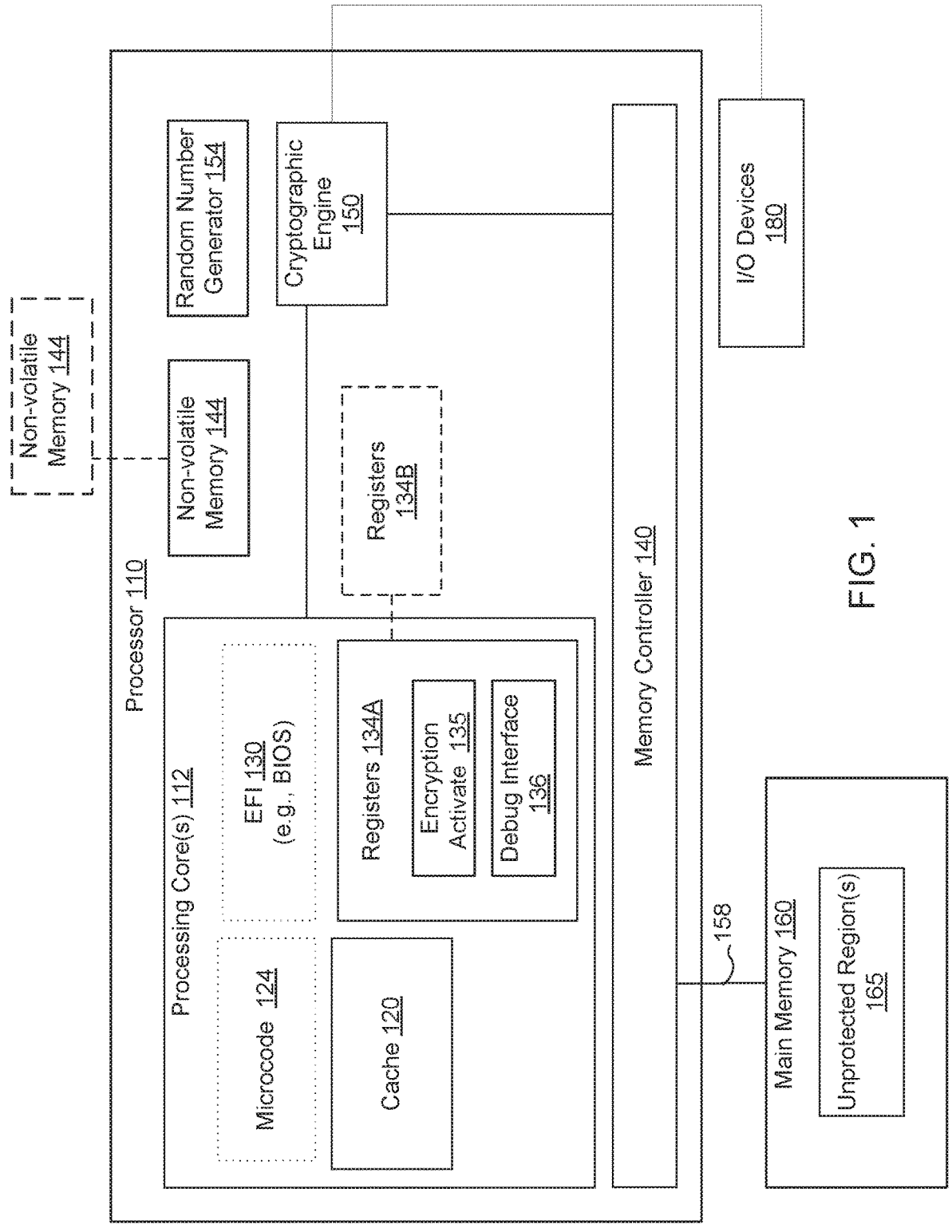
FIG. 1 is a block diagram illustrating a computer system that employs a cryptographic engine for implementing protection against unauthorized access to memory, according to various implementations of the disclosure.

Various techniques have been employed to protect sensitive data residing in regions of memory. Some processors provide cryptographic mechanisms for encryption, integrity, and replay protection. Memory encryption protects the confidentiality of memory-resident data. For example, an encryption mode known as total memory encryption (TME) may encrypt data that is moving from a processor core to memory, and may decrypt the encrypted data on its way back to the processor core. Thus, a cryptographic engine employing TME may be positioned between a processor core and input/output (I/O) devices and memory. A cryptographic key used for encryption and decryption may be stored within a multi-processor die (e.g., a system-on-a-chip (SoC)), such as within the cryptographic engine.

In some implementations, such as in Intel® Software Guard Extensions (SGX) technology, for example, a processor employs a memory encryption engine (MEE) to protect data when it is resident in memory, e.g., within protected enclaves or portions of memory. An enclave refers to a secure container, e.g., an isolated memory region of code and data within main memory that is protected with a level of security, which includes at least encryption. The memory an enclave uses is also sometimes referred to as an enclave page cache (EPC). The MEE extends encryption protection (such as provided by the TME) to provide additional security properties such as integrity and replay protection. Thus, when reference is made to TME herein, reference may also be understood to be made to the MEE at least in terms of encryption and decryption. Integrity protection prevents an attacker from causing hidden modifications to the cipher text (e.g., encrypted data, as opposed to plaintext which is unencrypted data) in memory. Furthermore, replay protection eliminates undetected temporal substitution of the cipher text. In the absence of such protections the MEE provides, an attacker with physical access to the system can record snapshots of data lines and replay them at a later point in time to gain access to the memory-resident data.

Total Memory Encryption (TME) (or other differently named encryption) is a capability to encrypt the entirety of physical memory of a system. This capability may be enabled in early stages of a boot process with a change to BIOS and once configured and locked, may cause encryption of data on external memory buses of a SoC (or processor die) using, for example. National Institute of Standards and Technology (NIST) standard AES-XTS algorithm with 128-bit keys, although other standards are envisioned. The encryption key used for TME employs a hardware random number generator implemented in the SoC and the keys are not accessible by software or generally by using external interfaces to the SoC. This TME capability is intended to provide protections of AES-XTS to external memory buses and dual in-line memory modules (DIMMs). The TME architecture is flexible and may support additional memory protections schemes in the future. When TME is enabled, e.g., through BIOS, the TME is intended to support (unmodified) existing system and application software.

The TME capability, furthermore, may protect against attackers with physical possession of a computing device of system. One example of a primary attack to be mitigated may be when an attacker freezes (e.g., with a Freon spray) the DIMM on a booted system, removes the DIMM, and quickly places the DIMM into another system where the memory contents are retrieved or downloaded to recover user and system credentials, e.g., password hashes, bitlocker keys, and the like. Further, by design, system debug features of a debug mode are allowed to access data stored in system memory. Examples of such a debug mode may include processor core run control (e.g., probe mode), debug direct memory access (DMA) associated with the ability of I/O devices to directly access shared memory locations on the DIMMs. or other mode in which the system provides consent to access of system memory that bypasses memory encryption, e.g., bypasses TME or other system encryption mode. Because these debug features access the same paths as the processor core and I/O devices, the debug features may access plaintext versions of data stored in the memory.

Historically, TME has been secured from attackers with debug access by permanently disabling all debug features that can access system memory. The permanent disable was achieved by programming an on-die fuse. For this previous solution to be effective, debug had to be completed before the on-die fuse was blown. Once blown, non-privileged debug access to memory was permanently disabled, which was not good for later debug access needs and was inconsistent with TME's use model: a BIOS opt-in feature.

Accordingly, in one implementation, a processor or system may include a processor core to execute a set of instructions to determine that a memory encryption mode (e.g., TME, MEE, or other encryption mode) is enabled, e.g., by reading a bit stored in an encryption activate register. The memory encryption mode may cause data stored to memory to be encrypted and data retrieved from the memory to be decrypted. The processor core may further determine that a debug mode has been enabled, e.g., by reading a bit stored in a debug interface register. The processor core may further, responsive to a determination that the debug mode has been enabled, generate a second encryption key different than a first encryption key employed before reboot of a computing system driven by the processor core, e.g., by the debug mode causing a deterministic tweak in the key generation process. A deterministic tweak may be understood as a cryptographic tweak which, given a particular input, will always produce the same output, with the underlying machine passing through the same sequence of states to generate the same output. The processor core may transmit the second encryption key to a cryptographic engine (e.g., TME engine, MEE) for use in encryption and decryption of the data. In one implementation, the cryptographic engine generates its own encryption keys. In another implementation, the processor core executes microcode (e.g., micro-instructions or micro-ops) to generate the encryption keys as will be discussed in more detail.

By enabling use of a debug interface register and supporting logic to protect encrypted memory from debug (or other unauthorized access), the disclosed protections enables memory debug features to be enabled and disabled dynamically, without exposing confidential data stored in memory to attackers with physical debug access. This represents a significant advantage over previous solutions that require memory debug features to be permanently disabled.

FIG. 1 is a block diagram illustrating a computer system 100 that employs a cryptographic engine for implementing protection against unauthorized access to memory, according to various implementations of the disclosure. The computer system 100 may include a processor 110, main memory 160, and one or more I/O devices 180. The processor 110 may be incorporated into a processing device that is a part of the computer system 100. The processor 110 may include one or more processing core(s) 112 (e.g., be a multi-core processor), a memory controller 140, non-volatile memory 144 (such as flash), a cryptographic engine 150, and a random number generator 154, among other components that may be located onto a single die of the processor 110. In an alternative implementation, the non-volatile memory 144 is computer storage located off-die of the processor 110 (indicated with the dashed lines).

In various implementations, the cryptographic engine 150 may include a total memory encryption (TME) hardware, a memory encryption engine (MEE), or other encryption engine. In one implementation the random number generator 154 is located on the processing core 112. The processing core 112 may execute micro-instructions of the microcode 124, using a random number generated by the random number generator 154, to generate an encryption key for use by the cryptographic engine 150. In an alternative implementation, the cryptographic engine 150 generates the encryption key and then uses the encryption key to encrypt and decrypt data stored to and retrieved from the main memory 160, respectively.

In various implementations, each processing core 112 may include a cache 120, microcode 124, a set of instructions for executing an extensible firmware interface (EFI) 130 such as basic input/output system (BIOS), and a number of registers 134A. e.g., model-specific registers (MSRs) in one embodiment. Some of the registers 134A may be implemented as registers 134B, e.g., as part of uncore hardware of the processor 110 (indicated with the dashed lines). The registers 134A or 134B may include an encryption activate register 135 and a debug interface register 136. In one embodiment, the encryption activate register 135 is a TME activate MSR and the debug interface register 136 is a debug interface MSR. In one embodiment, the encryption activate register 135 and the debug interface register 136 are combined with bits for respective encryption and debug modes being located within a single register.

The cache 120 may include multiple levels of cache, such as L1 cache, L2 cache, and last level cache (LLC) positioned closest to the memory controller 140, although other levels of cache are envisioned. The memory controller 140 may be positioned between the cache 120 and the main memory 160, to direct storing data to and retrieving data from the main memory 160. The cryptographic engine 150 may be coupled to the processing core(s) 112, to the I/O devices 180, and to the memory controller 140, and may control protection of data stored to and retrieved from the main memory 160 via the memory controller 140.

In various implementations, the main memory 160 includes DIMMs made up of dynamic random access memory (DRAM), non-volatile random access memory (NVRAM), a combination of both, or other type of RAM. The main memory 160 may include one or more unprotected regions 165, but may otherwise be wholly protected and store encrypted data. The unprotected regions 165 may be designated as a range of memory addresses. The main memory may also store system software such as an operating system (OS), a virtual machine monitor (VMM), or the like. The OS and the VMM may be executable by one or more processor cores 112. Furthermore, when the computer system 100 is configured with the main memory 160 as NVRAM, then the NVRAM may also use encryption keys generated by the processor core 112 (or the cryptographic engine 150). If, however, the NVRAM were to be treated as non-volatile memory, there is an option to be able to have the same encryption key generated/reused across platform power cycles or reboots. The random number used to generate the encryption key may be stored in the non-volatile memory 144 as will be discussed in more detail with reference to FIG. 3.

In one implementation, the cryptographic engine 150 is located between the cache 120 and the memory controller 140 to perform encryption, decryption, and authentication of data lines moving in and out of the main memory 160. Accordingly, the data moving across connector line 158 between the memory controller 140 and the main memory 160 may be encrypted. These data lines may be associated with or accessed by system software, firmware, or an application of the system software. In one implementation, the cryptographic engine 150 is located on the processor die, while the main memory 160 is located off the processor die. According to one implementation, the cryptographic engine 150 processes multiple memory read requests in parallel to improve the access latency to the memory 160.

When the cryptographic engine 150 is a MEE, the MEE may perform counter mode encryption, which requires an encryption seed to be unique for a data line both temporally and spatially. An encryption seed may be a beginning alpha numeric (or just numeric) sequence, for example. While spatial uniqueness can be achieved by using the address of the data line to be accessed, temporal uniqueness can be achieved by using a counter that serves as the version of the data line. The MEE 150 may also protect the data lines in a protected region (e.g., a protected enclave) of the main memory 160 by using a counter tree structure in which the root of the tree is stored on-die and forms the root of trust (i.e., a trust boundary). The versions of the data lines are part of this counter tree structure. Alternatively, other protection mechanisms may be used for replay-protection.

With further reference to FIG. 1, the EFI 130 may be employed via the processor core 112 executing a set of instructions during boot of the computer system 100. As mentioned, the memory protection mode may be set by the EFI 130 during boot. In one implementation, when entering into the TME mode of memory protection, the EFI 130 sets a first bit in the encryption activate register 135. The EFI 130 may also set a second bit in the debug interface register 136 in order to indicate that a debug mode has been enabled. Different types of debug modes are discussed in more detail with reference to FIG. 2.

Figure 2:
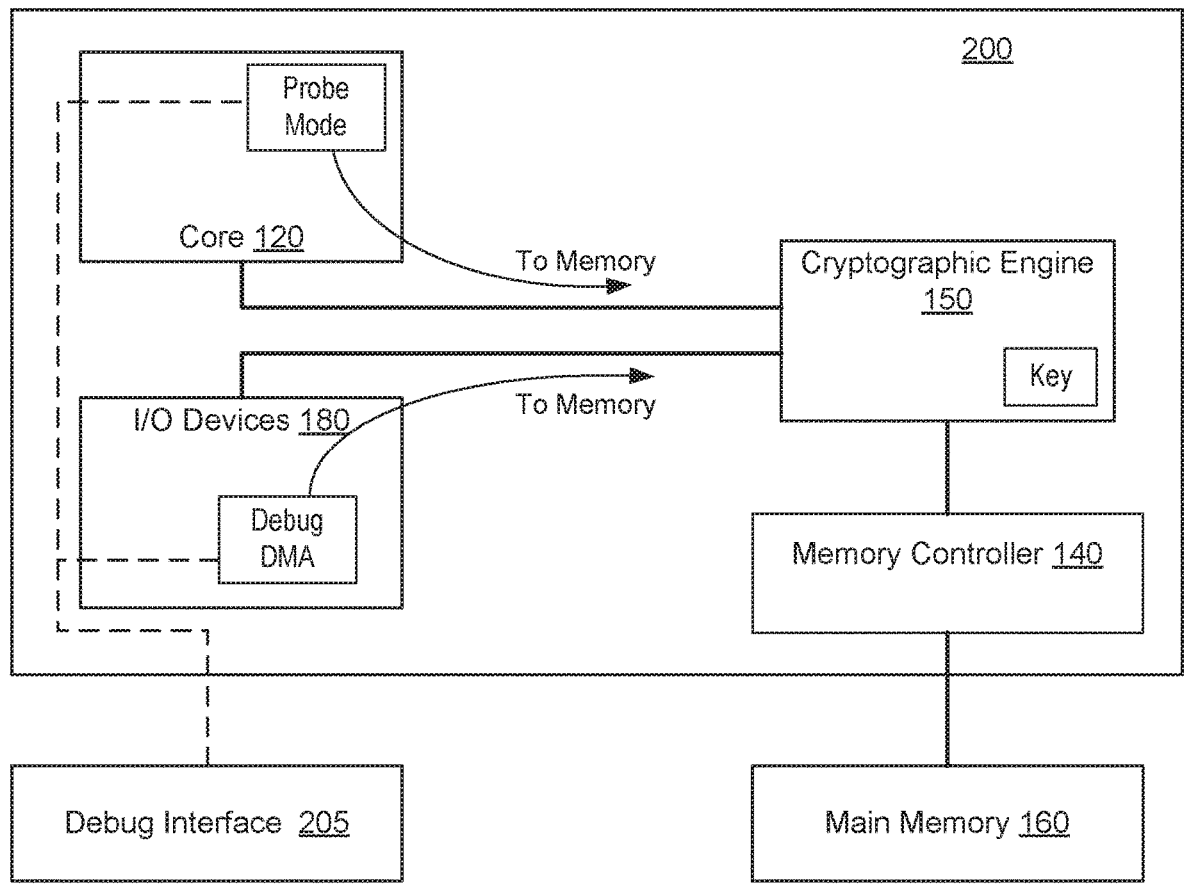
FIG. 2 is block diagram of a computer system in which encrypted data in memory is accessible in plain text via a debug hardware interface, according to implementations.

FIG. 2 is block diagram of a computer system 200 in which encrypted data in memory 160 is accessible in plain text via a debug hardware interface, according to implementations. In one implementation, the computer system 200 is similar to the computer system 100 of FIG. 1. When the EFI 130 sets bits of the debug interface register 136, the computer system 200 may activate a run control (e.g., probe mode) or debug direct memory access (DMA) (or other debug mode) for purposes of performing system and program debugging of the computer system 200. These debug features may access the main memory 160 through the same paths as the processor core 120 and the I/O devices 180 as illustrated by way of the free-flow arrows, allowing access to plaintext versions of the ciphered data stored in the main memory 160.

In one implementation, the debug features are controllable through a physical debug interface 205 such as a JTAG, a Universal Serial Bus (USB) interface, or other debug interface. JTAG stands for Joint Test Action Group, which codified the JTAG standard for verifying designs and testing printed circuit boards after manufacture. The darkened dashed lines in FIG. 2 illustrate the physical path from the debug interface 205 to the probe mode available via the processor core 120 and the debug DMA available via the I/O devices 180. Other debug modes and paths are envisioned in which the system provides consent to access of system memory (e.g., the main memory 160) that bypasses memory encryption, e.g., bypasses TME or other system encryption mode such as the MEE.

Thus, in conventional systems, via a simple hardware mechanism of connecting to a debug interface 205 and enabling a debug mode via the EFI 130 (during reboot), an attacker may extract the plaintext of ciphered data stored in the cryptographically-protected memory. By leveraging such debug features, the attacker may bypass TME protections without freezing and removing the DIMMs of the main memory 160. Instead, the attacker may extract the plaintext contents of the DIMMs through the JTAG or USB interfaces.

In probe mode, the EFI 130 sets an enable bit of the debug interface register 136 to indicate that debug mode is enabled, thereby granting consent to a requesting user to access debug features. Execution of debug features may include execution of debug code from other sources such as from flash or RAM internal software. Thus, the debug interface 205 provides a backdoor into the main memory 160 because of privileges provided to debug devices to access all regions of the memory that the processor core 120 can access, whether or not protected by an encryption mode. The EFI 130 may also set a lock bit of the debug interface register that locks the state of the debug mode, whether enabled or disabled. This lock of the debug mode state may occur upon the first system machine interrupt (SMI). Once locked, the debug mode state (enabled/disabled) may persist until either of an I/O device or the computer system 200 is reset. Finally, the EFI 130 may also set a read bit of the debug interface register 136 to selectively grant permission to read the enabled bit and the lock bit of the debug interface MSR.

Figure 3:
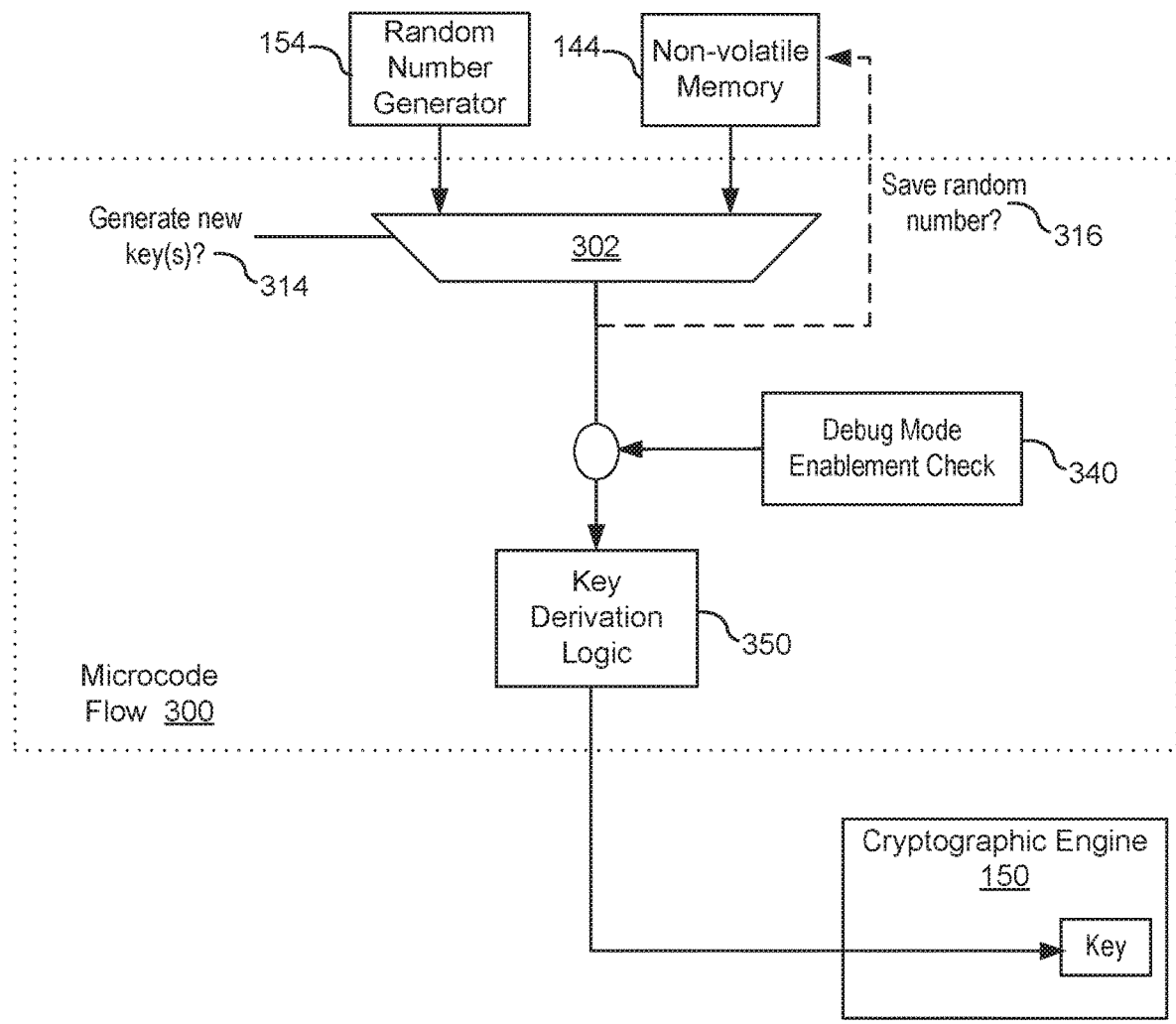
FIG. 3 is a flow diagram of a method for encryption key generation according to implementations.

FIG. 3 is a flow diagram 300 of a method for encryption key generation according to implementations. In implementations, the processor core 112 may execute the microcode 124 (FIG. 1) to perform the functions illustrated within the flow diagram 300 of FIG. 3. The microcode 124 may trigger a multiplexer 302 (or multiplexer equivalent logic) to select between a random number generated by the random number generator 154 (to generate a fresh encryption key) and one saved in the non-volatile memory 144 (to regenerate a previously-used encryption key). If the random number is retrieved from the non-volatile memory 144, an encryption key may be regenerated that was employed before reboot and a fresh power cycle. In either case, the processor core 112 may execute microcode to perform key derivation logic 350 in order to generate the encryption key, whether the fresh encryption key or the previously-used encryption key. The key derivation logic 350 may be executed in response to a second bit being set in a second register to indicate that a debug mode has been enabled.

In various implementations, the bits stored in the encryption activate register 135, which may be set during reboot of the computer system 300, may dictate whether a new key is generated and whether the random number is saved to the non-volatile memory 144. For example, a bit from the encryption activate register may be fed as a first signal 314 to the microcode to trigger the multiplexer 302 to choose between the random number generator and the non-volatile memory 144. Another bit or the same bit from the encryption activate register 135 may be fed as a second signal 316 to the microcode to dictate whether the random number chosen by the multiplexer 302 is to be saved to the non-volatile memory, e.g., for use after a later restart or reboot to regenerate the encryption key. The key derivation logic 350 may generate the encryption key in the case of a new random number received from the random number generator 154 or regenerate a previous encryption key in the case of a previous random number being passed from the non-volatile memory 144.

In some implementations, new encryption keys may be generated for warm or cold boot scenarios where memory is not retained. A warm boot scenario is where a computing system is restarted from an operating system, and thus is not powered down. A cold boot scenario is where a computing system is shut down completed (powered off) and then restarted. These encryption keys, however, may be regenerated for scenarios where memory is retained. Examples where encryption keys are regenerated include, but are not limited to, non-volatile memory accesses and low-power standby flows. e.g., resume from standby. To prevent unauthorized access to the main memory 160 to extract plaintext versions of encrypted data, the microcode 124 may be forced to perform a debug mode enablement check 340 before execution of the key derivation logic 350. This check may enable the microcode to force use of a deterministic tweak to generate a new encryption key in the cases where the debug mode is enabled, as is now discussed in more detail with reference to FIG. 4.

Figure 4:
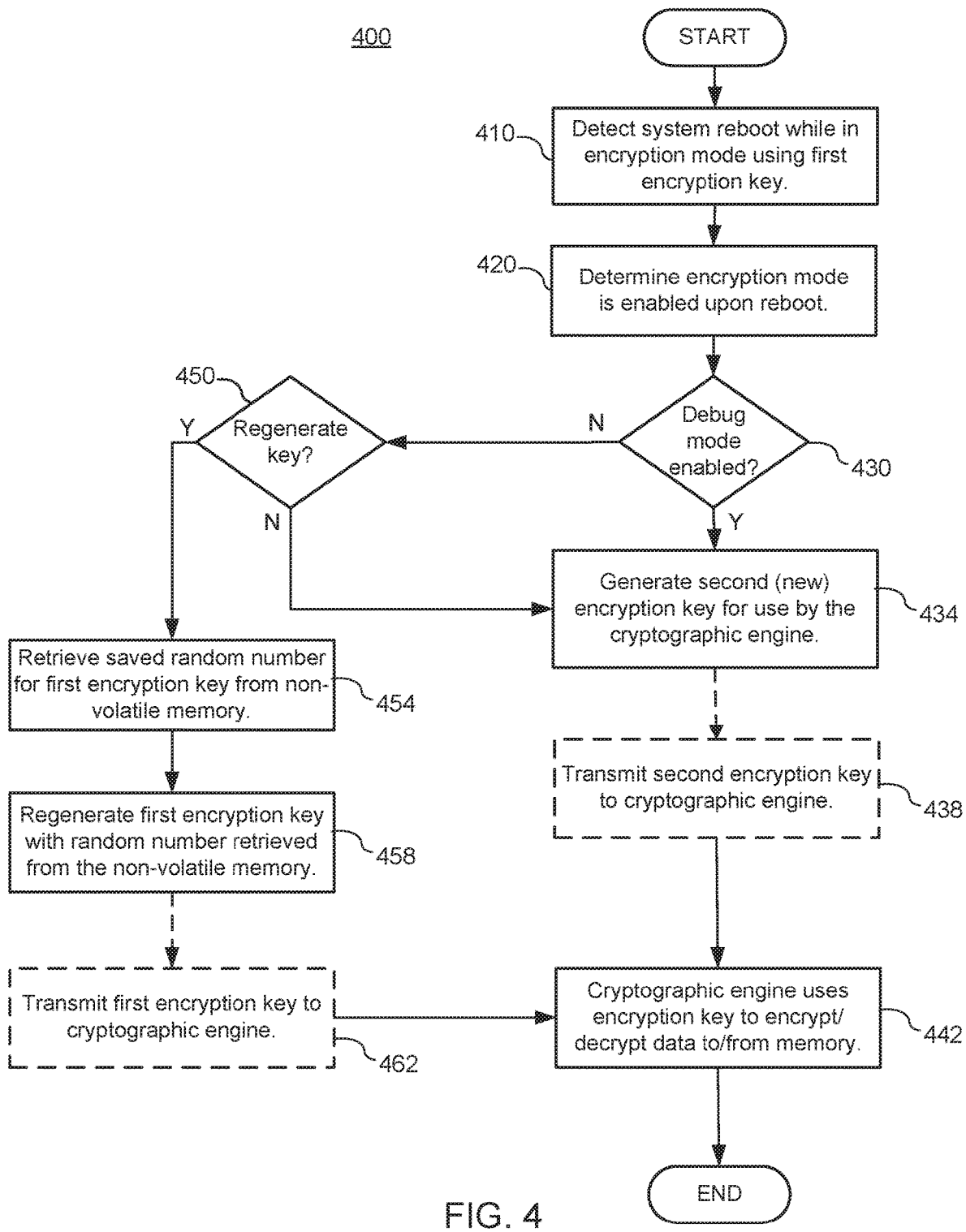
FIG. 4 is a flow chart of a method of preventing unauthorized access to encrypted memory, according to implementations.

FIG. 4 is a flow chart of a method 400 of preventing unauthorized access to encrypted memory, according to implementations. The method 400 may be performed by processing logic that may comprise hardware (e.g., circuitry, dedicated logic, programmable logic, microcode, etc.), software (such as instructions executed by the processor core(s) 112), firmware (including microcode) or a combination thereof. In one implementation, the method 400 is performed by processor 110 of FIG. 1. In another implementation, the method 400 is performed by any of the processors described with respect to FIGS. 5a-11. Alternatively, other components of the computer system 100 (or software executing on the processor 110) or 200 may perform some or all of the operations of the method 400.

Referring to FIG. 4, the method 400 begins with the processing logic detecting a system reboot while in an encryption mode (e.g., TME, MEE, or other mode) using a first encryption key (410). The method 400 may continue with the processing logic determining that the encryption mode is enabled upon reboot (420). The encryption mode being enabled may be determined by reading a bit from the encryption activate register 135. The method 400 may continue with the processing logic determining whether a debug mode is enabled, e.g., by detecting a status of the operation system being in debug mode (430). The debug mode being enabled may be determined by reading a bit from the debug interface register 136.

With continued reference to FIG. 4, if the debug mode is detected as enabled, the method 400 may continue with the processing logic generating a second encryption key, different from the first encryption key, for use by the cryptographic engine (434). The processing logic may generate the second encryption key with a deterministic tweak in the key generation process, or execute other key-generation logic, in response to detection of a debug mode status. The second encryption key (e.g., a debug key) may be deterministic to support debug mode through power states such as a warm reset. In one implementation, the cryptographic engine 150 is the component to generate the second encryption key with such deterministic tweaking. In another implementation, the processor core 112 executes a set of micro-instructions from the microcode 124 or otherwise executes the key derivation logic 350 to generate the second encryption key with the deterministic tweak.

In embodiments, when the cryptographic engine 150 does not generate the second encryption key, the method 400 may continue with the processing logic transmitting the second encryption key to the cryptographic engine for use by the cryptographic engine (438). The method 400 may continue with the cryptographic engine 443 using the second encryption key to encrypt the data to be stored in the memory 160 and decrypt the data to be retrieved from the memory (442). In this way, an attacker cannot circumvent the memory encryption and decryption by way of a reboot and triggering the debug mode via the EFI 130. If the attacker tries to access the data using the first encryption key, the data will be garbled because the attacker did not use the second encryption key for accessing the data in the memory 160.

With continued reference to FIG. 4, if the debug mode is not enabled at block 430, the method 400 may continue with the processing logic determining whether to regenerate the first encryption key being used before system reboot (450). Scenarios in which data in the memory 160 is retained during reboot are examples of instances where the encryption key may be regenerated, as previously discussed. If the first encryption key does not need to be regenerated, the method 400 may continue with the processing logic generating the second encryption key different from the first encryption key with a new random number for use by the cryptographic engine (454). If the first encryption key does need to be regenerated, the method 400 may continue with the processing logic retrieving a saved random number for the first encryption key from the non-volatile memory 144 (454). The method 400 may continue with the processing logic regenerating the first encryption key with the random number retrieved from the non-volatile memory (458). The method 400 may continue with the processing logic optionally transmitting the first encryption key to the cryptographic engine, e.g., where the cryptographic engine did not generate the first encryption key (462). The method 400 may continue with the cryptographic engine using the first encryption key to encrypt the data to be stored in the memory 160 and decrypt the data to be retrieved from the memory (442). In this way, when debug mode is not enabled and the key should be regenerated to access retained memory, the processing logic may regenerate the first key employed before reboot of the computing system 100 or 200.

FIG. 5A is a block diagram illustrating a micro-architecture for a processor 500 that implements hardware support for preventing unauthorized access to encrypted memory, according to an implementation. Specifically, processor 500 depicts an in-order architecture core and a register renaming logic, out-of-order issue/execution logic to be included in a processor according to at least one implementation of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one implementation, processor 500 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different scheduler circuits, including reservations stations (RS), central instruction window, etc. The scheduler unit(s) 556 is coupled to the physical register set(s) unit(s) 558. Each of the physical register set(s) units 558 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 558 is overlapped by the retirement unit 554 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register set(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 556, physical register set(s) unit(s) 558, and execution cluster(s) 560 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some implementations DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary implementation, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one implementation, the data prefetcher 580 speculatively loads/prefetches data to the DCU 574 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of Imagination Technologies of Kings Langley, Hertfordshire. UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 500 of FIG. 5A according to some implementations of the disclosure. The solid lined boxes in FIG. 5B illustrate an in-order pipeline 501, while the dashed lined boxes illustrate a register renaming, out-of-order issue/execution pipeline 503. In FIG. 5B, the pipelines 501 and 503 include a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some implementations, the ordering of stages 502-524 may be different than illustrated and are not limited to the specific ordering shown in FIG. 5B.

Figure 6:
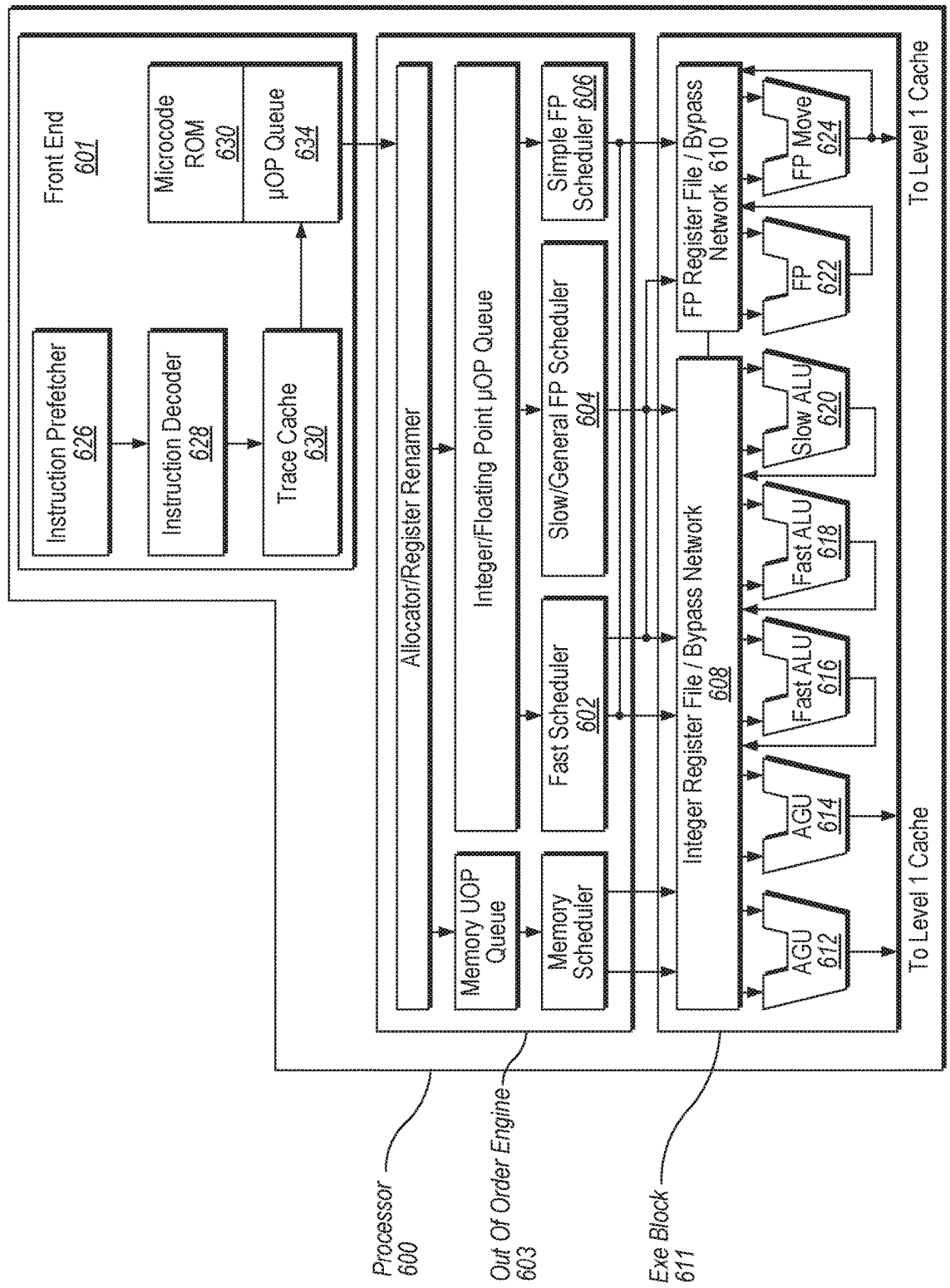
FIG. 6 illustrates a block diagram of the micro-architecture for a processor or an integrated circuit that implements hardware support for static mode of protected memory management on flexibly-convertible enclave platform, according to an implementation of the disclosure.

FIG. 6 illustrates a block diagram of the micro-architecture for a processor 600 that includes logic circuits of a processor or an integrated circuit that implements hardware support for preventing unauthorized access to encrypted memory, according to an implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 601 is the part of the processor 600 that fetches instructions to be executed and prepares them to be used later in the processor pipeline. The implementations of the page additions and content copying can be implemented in processor 600.

The front end 601 may include several units. In one implementation, the instruction prefetcher 616 fetches instructions from memory and feeds them to an instruction decoder 618 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 630 takes decoded uops and assembles them into program ordered sequences or traces in the uop queue 634 for execution. When the trace cache 630 encounters a complex instruction, microcode ROM (or RAM) 632 provides the uops needed to complete the operation.

Some instructions are converted into a single micro-op, whereas others need several micro-ops to complete the full operation. In one implementation, if more than four micro-ops are needed to complete an instruction, the decoder 618 accesses the microcode ROM 632 to do the instruction. For one implementation, an instruction can be decoded into a small number of micro ops for processing at the instruction decoder 618. In another implementation, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one implementation from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one implementation can schedule on each half of the main clock cycle while the other schedulers can only schedule once per main processor clock cycle. The schedulers arbitrate for the dispatch ports to schedule uops for execution.

Register sets 608, 610, sit between the schedulers 602, 604, 606, and the execution units 612, 614, 616, 618, 620, 622, 624 in the execution block 611. There is a separate register set 608, 610, for integer and floating point operations, respectively. Each register set 608, 610, of one implementation also includes a bypass network that can bypass or forward just completed results that have not yet been written into the register set to new dependent uops. The integer register set 608 and the floating point register set 610 are also capable of communicating data with the other. For one implementation, the integer register set 608 is split into two separate register sets, one register set for the low order 32 bits of data and a second register set for the high order 32 bits of data. The floating point register set 610 of one implementation has 128 bit wide entries because floating point instructions typically have operands from 64 to 128 bits in width.

The execution block 611 contains the execution units 612, 614, 616, 618, 620, 622, 624, where the instructions are actually executed. This section includes the register sets 608, 610, that store the integer and floating point data operand values that the micro-instructions need to execute. The processor 600 of one implementation is comprised of a number of execution units: address generation unit (AGU) 612, AGU 614, fast ALU 616, fast ALU 618, slow ALU 620, floating point ALU 612, floating point move unit 614. For one implementation, the floating point execution blocks 612, 614, execute floating point. MMX, SIMD, and SSE, or other operations. The floating point ALU 612 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 616, 618. The fast ALUs 616, 618, of one implementation can execute fast operations with an effective latency of half a clock cycle. For one implementation, most complex integer operations go to the slow ALU 620 as the slow ALU 620 includes integer execution hardware for long latency type of operations, such as a multiplier, shifts, flag logic, and branch processing. Memory load/store operations are executed by the AGUs 622, 624. For one implementation, the integer ALUs 616, 618, 620, are described in the context of performing integer operations on 64 bit data operands. In alternative implementations, the ALUs 616, 618, 620, can be implemented to support a variety of data bits including 16, 32, 128, 256, etc. Similarly, the floating point units 622, 624, can be implemented to support a range of operands having bits of various widths. For one implementation, the floating point units 622, 624, can operate on 128 bits wide packed data operands in conjunction with SIMD and multimedia instructions.

In one implementation, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 7:
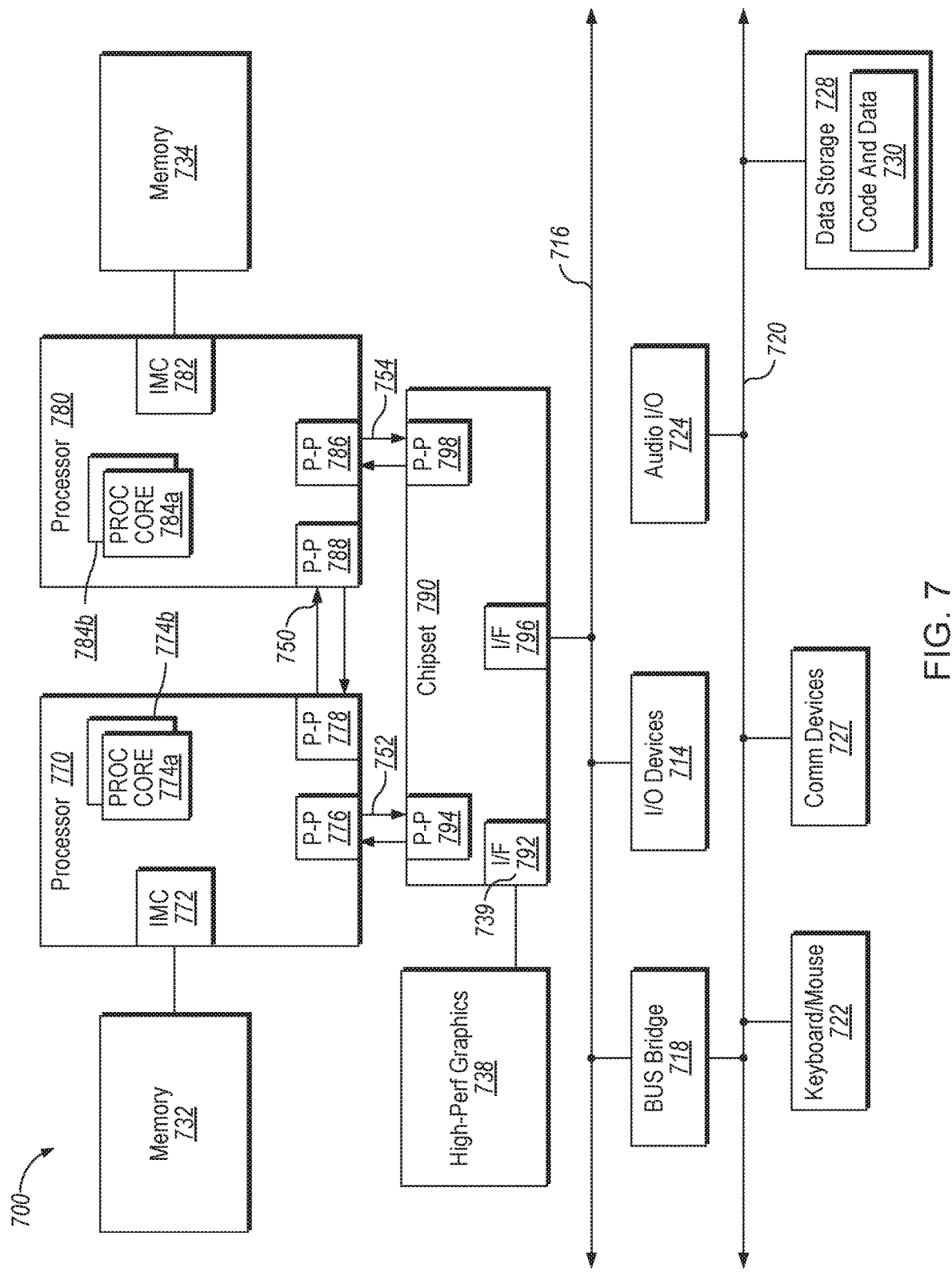
FIG. 7 is a block diagram of a computer system according to one implementation.

Implementations may be implemented in many different system types. Referring now to FIG. 7, shown is a block diagram of a multiprocessor system 700 in accordance with an implementation for preventing unauthorized access to encrypted memory. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774a and 774b and processor cores 784a and 784b), although potentially many more cores may be present in the processors. While shown with two processors 770, 780, it is to be understood that the scope of the disclosure is not so limited. In other implementations, one or more additional processors may be present in a given processor.

Processors 770 and 780 are shown including integrated memory controller units 772 and 782, respectively. Processor 770 also includes as part of its bus controller units point-to-point (P-P) interfaces 776 and 788; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

Chipset 790 may be coupled to a first bus 716 via an interface 796. In one implementation, first bus 716 may be a Peripheral Component Interconnect (PCI) bus, or a bus such as a PCI Express bus or interconnect bus, although the scope of the disclosure is not so limited.

Figure 8:
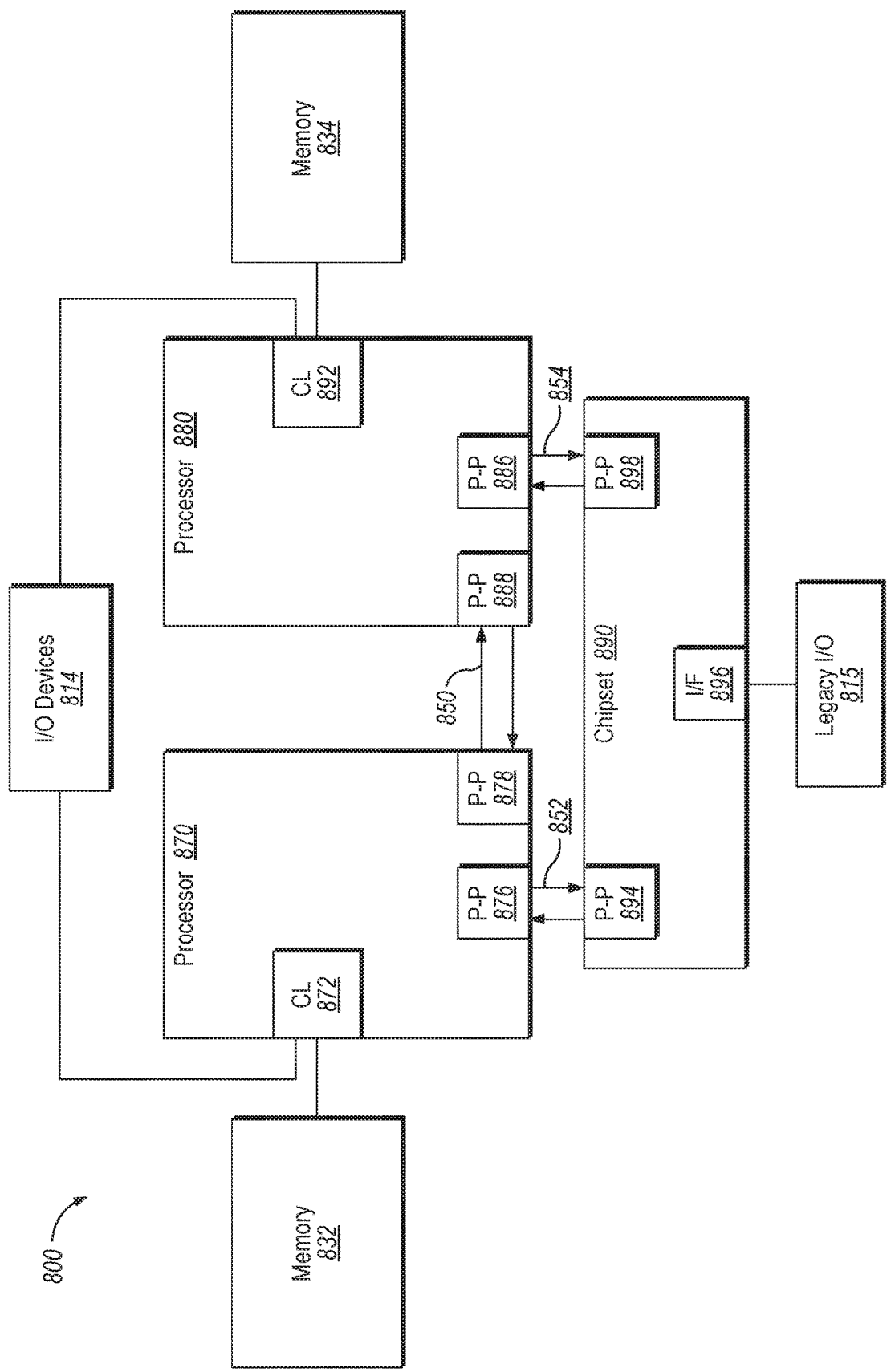
FIG. 8 is a block diagram of a computer system according to another implementation.

Referring now to FIG. 8, shown is a block diagram of a third system 800 for preventing unauthorized access to encrypted memory in accordance with an implementation of the disclosure. Like elements in FIGS. 7 and 8 bear like reference numerals and certain aspects of FIG. 8 have been omitted from FIG. 7 in order to avoid obscuring other aspects of FIG. 8.

FIG. 8 illustrates that the processors 870, 880 may include integrated memory and I/O control logic ("CL") 872 and 892, respectively. For at least one implementation, the CL 872, 882 may include integrated memory controller units such as described herein. In addition. CL 872, 892 may also include I/O control logic. FIG. 8 illustrates that the memories 832, 834 are coupled to the CL 872, 892, and that I/O devices 814 are also coupled to the control logic 872, 892. Legacy I/O devices 815 are coupled to the chipset 890.

Figure 9:
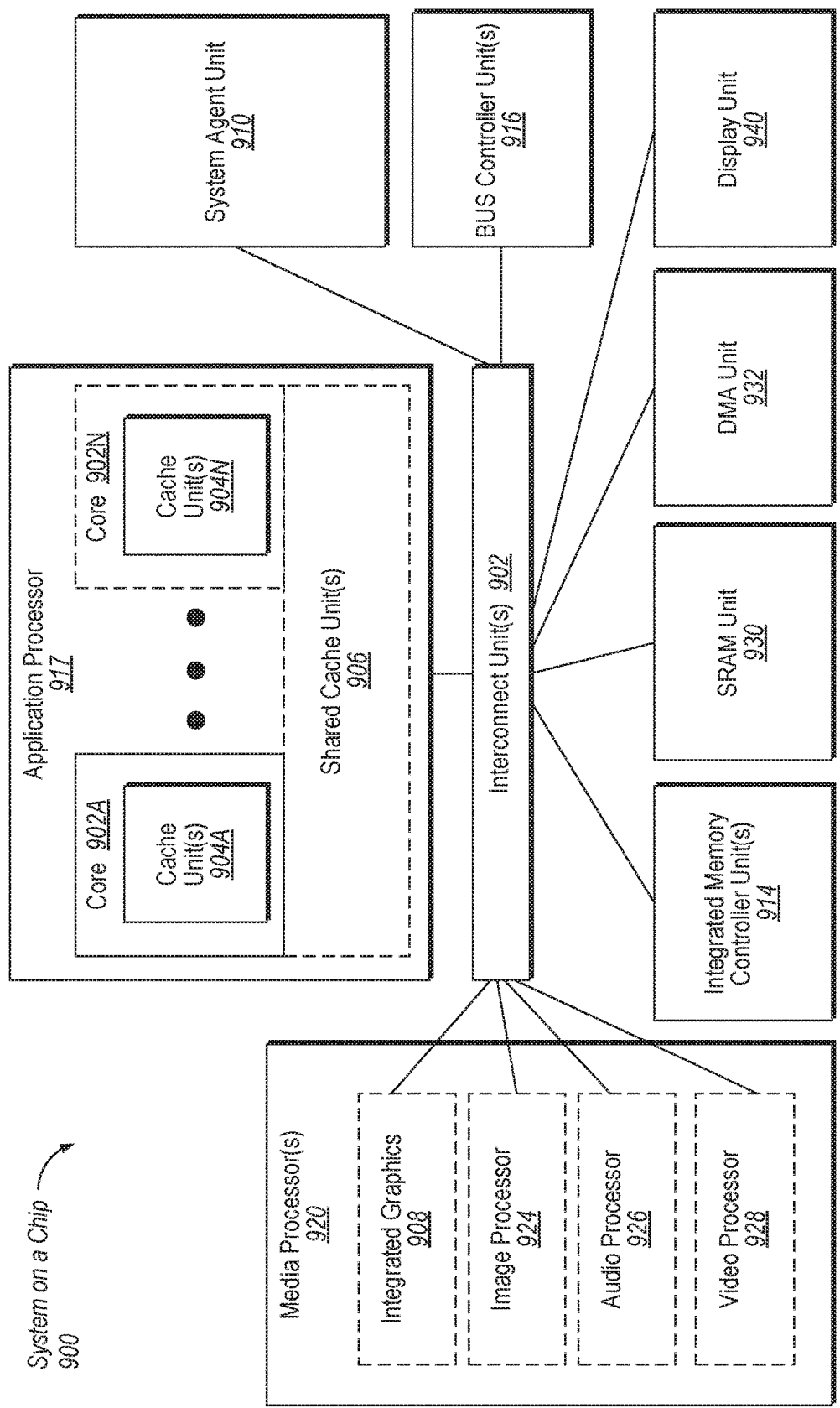
FIG. 9 is a block diagram of a system-on-a-chip according to one implementation.

FIG. 9 is an exemplary system on a chip (SoC) 900 that may include one or more of the cores 902A . . . 902N adapted to prevent unauthorized access to encrypted memory. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 900 of FIG. 9, dashed lined boxes are features on more advanced SoCs. An interconnect unit(s) 902 may be coupled to: an application processor 917 which includes a set of one or more cores 902A-N and shared cache unit(s) 906; a system agent unit 910; a bus controller unit(s) 916; an integrated memory controller unit(s) 914: a set of one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays.

Figure 10:
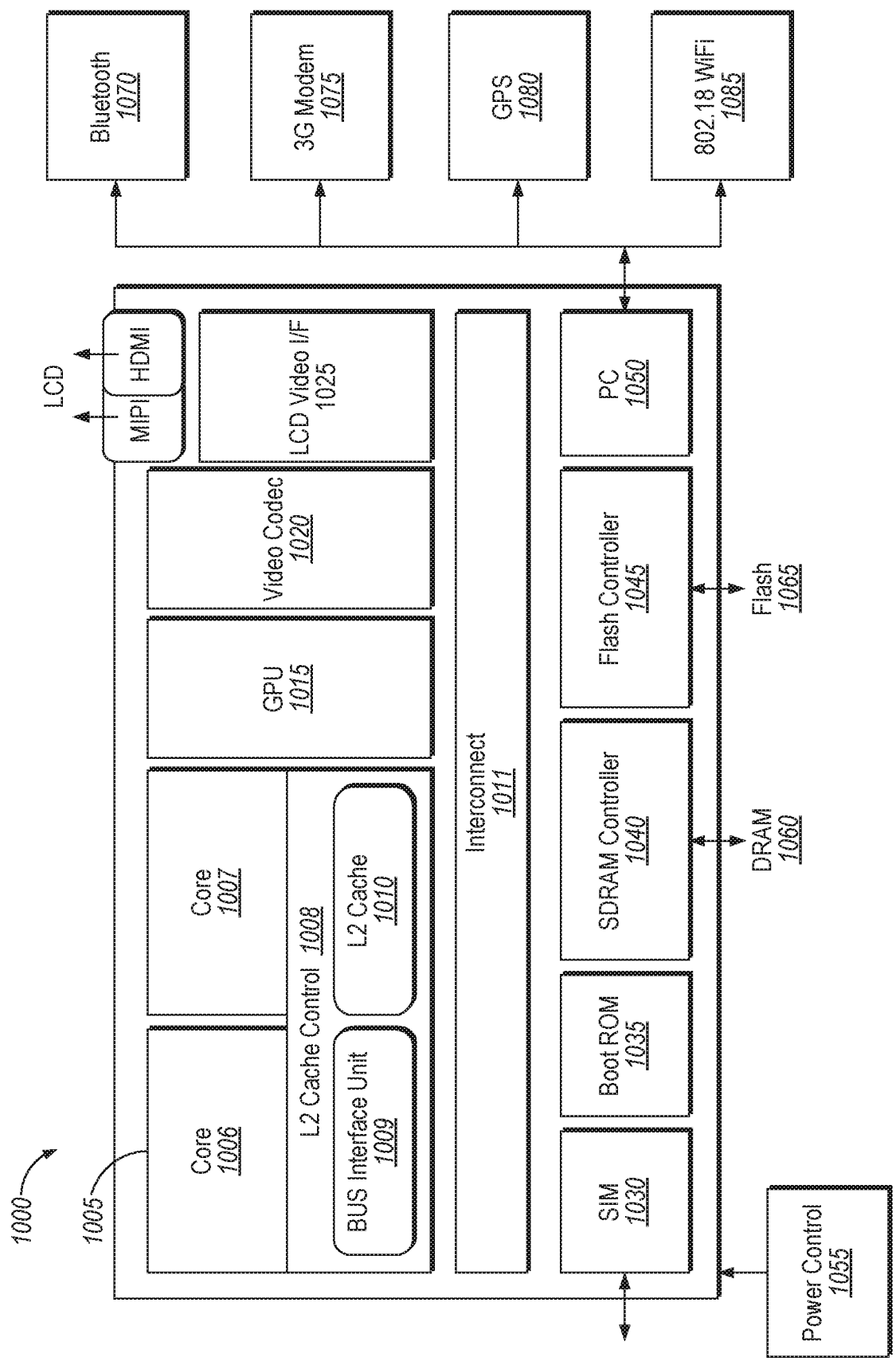
FIG. 10 illustrates another implementation of a block diagram for a computing system.

Turning next to FIG. 10, an implementation of a system on-chip (SoC) design in accordance with implementations of the disclosure is depicted. As an illustrative example, SoC 1000 is included in user equipment (UE). In one implementation. UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1000.

Here. SoC 1000 includes 2 cores-1006 and 1007. Similar to the discussion above, cores 1006 and 1007 may conform to an Instruction Set Architecture, such as a processor having the Intel® Architecture Core™, an Advanced Micro Devices. Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1011 includes an on-chip interconnect, such as an IOSF, AMBA, or other interconnects discussed above, which can implement one or more aspects of the described disclosure.

In one implementation. SDRAM controller 1040 may connect to interconnect 1011 via cache 1010. Interconnect 1011 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the implementations described herein.

In addition, the system illustrates peripherals for communication, such as a Bluetooth® module 1070, 3G modem 1075, GPS 1080, and Wi-Fi® 1185. Note as stated above, a UE includes a radio for communication. As a result, these peripheral communication modules may not all be included. However, in a UE some form of a radio for external communication should be included.

Figure 11:
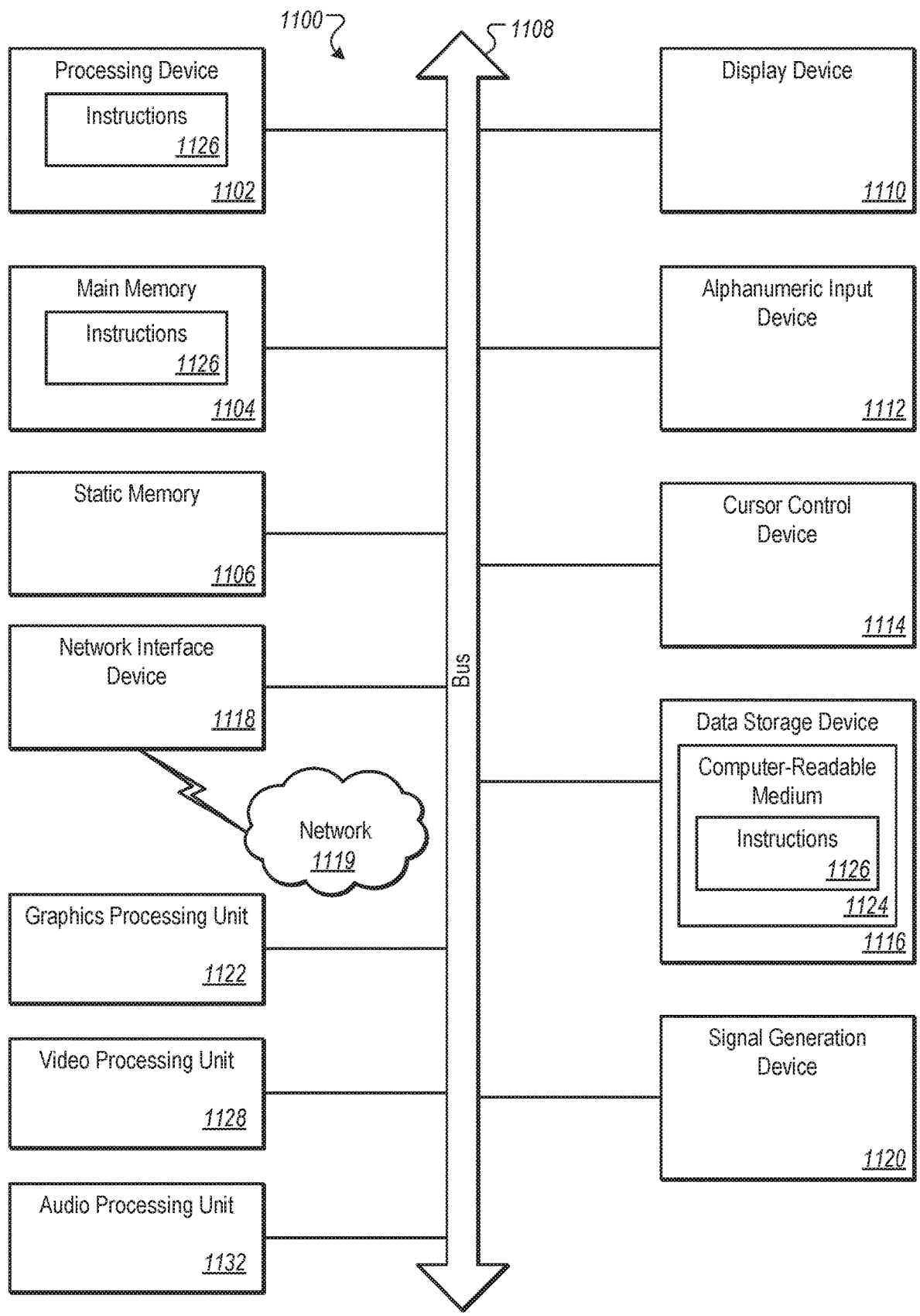
FIG. 11 illustrates another implementation of a block diagram for a computing system.

FIG. 11 illustrates a diagrammatic representation of a machine in the example form of a computing system 1100 within which a set of instructions, for causing the machine to perform any one or more of the methodologies discussed herein, may be executed, such as for preventing unauthorized access to encrypted memory. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1100 includes a processing device 1102, main memory 1104 (e.g., flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1116, which communicate with each other via a bus 1108.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application-specific integrated circuit (ASIC), a field programmable gate array (FPGA), a digital signal processor (DSP), network processor, or the like. In one implementation, processing device 1102 may include one or more processor cores. The processing device 1102 is configured to execute the processing logic 1126 for performing the operations discussed herein.

In one implementation, processing device 1102 can be part of a processor or an integrated circuit that includes the disclosed LLC caching architecture. Alternatively, the computing system 1100 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1100 may further include a network interface device 1118 communicably coupled to a network 1119. The computing system 1100 also may include a video display device 1110 (e.g., a liquid crystal display (LCD) or a cathode ray tube (CRT)), an alphanumeric input device 1112 (e.g., a keyboard), a cursor control device 1114 (e.g., a mouse), a signal generation device 1120 (e.g., a speaker), or other peripheral devices. Furthermore, computing system 1100 may include a graphics processing unit 1122, a video processing unit 1128 and an audio processing unit 1132. In another implementation, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1116 may include a computer-readable storage medium 1124 on which is stored software 1126 embodying any one or more of the methodologies of functions described herein. The software 1126 may also reside, completely or at least partially, within the main memory 1104 as instructions 1126 and/or within the processing device 1102 as processing logic during execution thereof by the computing system 1100; the main memory 1104 and the processing device 1102 also constituting computer-readable storage media.

The computer-readable storage medium 1124 may also be used to store instructions 1126 utilizing the processing device 1102, and/or a software library containing methods that call the above applications. While the computer-readable storage medium 1124 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is processor comprising: 1) a first register; and 2) a processor core coupled to the first register, the processor core to: a) determine that a memory encryption mode is enabled by access to a bit in the first register, wherein the memory encryption mode is to cause data stored to memory to be encrypted and data retrieved from the memory to be decrypted; b) determine that a debug mode has been enabled; c) responsive to a determination that the debug mode has been enabled, generate a second encryption key different than a first encryption key employed before reboot of a computing system: and d) transmit the second encryption key to a cryptographic engine for use in encryption and decryption of the data according to the memory encryption mode.

In Example 2, the processor of Example 1, wherein to generate the second encryption key, the processor core is to cause a deterministic tweak in key generation to generate the second encryption key.

In Example 3, the processor of Example 1, wherein to determine that the debug mode is enabled comprises to read a bit from a debug interface register.

In Example 4, the processor of Example 1, wherein the memory comprises one of dynamic random access memory (DRAM) or non-volatile random access memory (NVRAM).

In Example 5, the processor of Example 1, wherein the cryptographic engine comprises a total memory encryption (TME) engine.

In Example 6, the processor of Example 1, wherein the cryptographic engine comprises, in part, a memory encryption engine (MEE).

Various implementations may have different combinations of the structural features described above. For instance, all optional features of the processors and methods described above may also be implemented with respect to a system described herein and specifics in the examples may be used anywhere in one or more implementations.

Example 7 is a system comprising: 1) memory; 2) a processor core coupled to the memory, the processor core comprising a set of instructions that is to execute an extensible firmware interface, wherein the processor core is to execute the set of instructions to: a) set a first bit in a first register to indicate that a memory encryption mode has been enabled; and b) set a second bit in a second register to indicate that a debug mode has been enabled; and 3) a cryptographic engine coupled to the processor core and to the memory, the cryptographic engine to: a) responsive to the second bit being set, generate a second encryption key different than a first encryption key employed before system reboot; and b) responsive to the first bit being set, encrypt, using the second encryption key, data to be written to the memory and decrypt data to be retrieved from the memory.

In Example 8, the system of Example 7, wherein to generate the second encryption key, the cryptographic engine is to cause a deterministic tweak in key generation.

In Example 9, the system of Example 7, wherein to generate the second encryption key, the cryptographic engine is to execute key derivation logic.

In Example 10, the system of Example 7, wherein the processor core is further to: a) execute microcode to generate the second encryption key; and b) transmit the second encryption key to the cryptographic engine.

In Example 11, the system of Example 7, wherein the first register comprises an encryption activate register.

In Example 12, the system of Example 7, wherein the second register comprises a debug interface register.

In Example 13, the system of Example 7, wherein the cryptographic engine comprises a total memory encryption (TME).

In Example 14, the system of Example 7, wherein the cryptographic engine comprises, in part, a memory encryption engine (MEE).

Various implementations may have different combinations of the structural features described above. For instance, all optional features of the processors and methods described above may also be implemented with respect to a system described herein and specifics in the examples may be used anywhere in one or more implementations.

Example 15 is a method comprising: 1) determining, by a processor core, that a memory encryption mode is enabled, wherein the memory encryption mode causes data stored to memory to be encrypted and data retrieved from the memory to be decrypted; 2) determining, by the processor core, that a debug mode has been enabled; 3) responsive to determining that the debug mode has been enabled, generating, by the processor core, a second encryption key different than a first encryption key employed before reboot of a computing system; and 4) transmitting, by the processor core, the second encryption key to a cryptographic engine for use in encrypting and decrypting the data according to the memory encryption mode.

In Example 16, the method of Example 15, wherein generating the second encryption key comprises the processor core causing a deterministic tweak in key generation.

In Example 17, the method of Example 15, wherein generating the second encryption key comprises the processor core executing a set of microinstructions.

In Example 18, the method of Example 15, wherein determining that the memory encryption mode is enabled comprises reading a bit stored in an encryption activate register.

In Example 19, the method of Example 15, wherein determining that the debug mode is enabled comprises reading a bit from a debug interface register.

In Example 20, the method of Example 15, wherein the cryptographic engine comprises one of a total memory encryption (TME) engine or a memory encryption engine (MEE).

Various implementations may have different combinations of the structural features described above. For instance, all optional features of the processors and methods described above may also be implemented with respect to a system described herein and specifics in the examples may be used anywhere in one or more implementations.

Example 21 is a non-transitory, computer-readable storage medium storing instructions, which when executed by a processing device, causes the processing device to execute multiple operations comprising: 1) determining, by a processor core, that a memory encryption mode is enabled, wherein the memory encryption mode causes data stored to memory to be encrypted and data retrieved from the memory to be decrypted; 2) determining, by the processor core, that a debug mode has been enabled; 3) responsive to determining that the debug mode has been enabled, generating, by the processor core, a second encryption key different than a first encryption key employed before reboot of a computing system; and 4) transmitting, by the processor core, the second encryption key to a cryptographic engine for use in encrypting and decrypting the data according to the memory encryption mode.

In Example 22, the non-transitory, computer-readable storage medium of Example 21, wherein generating the second encryption key comprises the processor core causing a deterministic tweak in key generation.

In Example 23, the non-transitory, computer-readable storage medium of Example 21, wherein generating the second encryption key comprises the processor core executing a set of microinstructions.

In Example 24, the non-transitory, computer-readable storage medium of Example 21, wherein determining that the memory encryption mode is enabled comprises reading a bit stored in an encryption activate register.

In Example 25, the non-transitory, computer-readable storage medium of Example 21, wherein determining that the debug mode is enabled comprises reading a bit from a debug interface register.

In Example 26, the non-transitory, computer-readable storage medium of Example 21, wherein the cryptographic engine comprises one of a total memory encryption (TME) engine or a memory encryption engine (MEE).

Various implementations may have different combinations of the structural features described above. For instance, all optional features of the processors and methods described above may also be implemented with respect to a system described herein and specifics in the examples may be used anywhere in one or more implementations.

Example 27 is a system comprising: 1) means for determining that a memory encryption mode is enabled, wherein the memory encryption mode causes data stored to memory to be encrypted and data retrieved from the memory to be decrypted; 2) means for determining that a debug mode has been enabled; 3) means for, responsive to determining that the debug mode has been enabled, generating a second encryption key different than a first encryption key employed before reboot of a computing system; and 4) means for transmitting the second encryption key to a cryptographic engine for use in encrypting and decrypting the data according to the memory encryption mode.

In Example 28, the system of Example 27, wherein means for generating the second encryption key comprises means for the processor core causing a deterministic tweak in key generation.

In Example 29, the system of Example 27, wherein means for generating the second encryption key comprises means for executing a set of microinstructions.

In Example 30, the system of Example 27, wherein means for determining that the memory encryption mode is enabled comprises means for reading a bit stored in an encryption activate register.

In Example 31, the system of Example 27, wherein means for determining that the debug mode is enabled comprises means for reading a bit from a debug interface register.

In Example 32, the system of Example 27, wherein the cryptographic engine comprises one of a total memory encryption (TME) engine or a memory encryption engine (MEE).

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones. Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EE-PROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' 'capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices: optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc. Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing." "linking," "associating," "obtaining." "authenticating," "prohibiting." "executing." "requesting," "communicating." or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second." "third." "fourth," etc. as used herein are meant as labels to distinguish among different elements and may not necessarily have an ordinal meaning according to their numerical designation.

What is claimed is:

1. A processor comprising:
 a cryptographic engine;
 a processor core coupled to the cryptographic engine, the processor core to:
  upon reboot of a computing system, determine that a memory encryption mode is enabled based on a value of a bit in a first register, wherein the memory encryption mode is to cause data stored to memory to be encrypted and data retrieved from the memory to be decrypted; and
  responsive to a determination that a non-privileged memory debug mode has been enabled:
   generate a second encryption key different than a first encryption key employed before the reboot of the computing system, wherein use of the first encryption key will fail to access data stored in memory, wherein to generate the second encryption key comprises to cause a deterministic tweak in key generation, and
   provide the second encryption key to the cryptographic engine for use in encryption and decryption of the data according to the memory encryption mode.

2. The processor of claim 1, wherein to determine that the non-privileged memory debug mode is enabled comprises to read a bit from a debug interface register.

3. The processor of claim 1, wherein the memory comprises one of dynamic random access memory (DRAM) or non-volatile random access memory (NVRAM).

4. The processor of claim 1, wherein the cryptographic engine comprises a total memory encryption (TME) engine.

5. The processor of claim 1, wherein the cryptographic engine comprises, in part, a memory encryption engine (MEE).

6. A system comprising:
 memory;
 a processor core coupled to the memory, the processor core to execute an extensible firmware interface to:
  set a first bit in a first register to indicate that a memory encryption mode has been enabled; and
  set a second bit in a second register to indicate that a non-privileged memory debug mode has been enabled; and
 a cryptographic engine coupled to the processor core and to the memory, the cryptographic engine to:
  responsive to the second bit being set and a reboot of the system:
   generate a second encryption key different than a first encryption key employed before the reboot of the system, wherein the first encryption key will fail to access data stored in memory, wherein to generate the second encryption key comprises causing a deterministic tweak in key generation,
  responsive to the first bit being set and generation of the second encryption key, encrypt, using the second encryption key, data to be written to the memory and decrypt data to be retrieved from the memory.

7. The system of claim 6, wherein to generate the second encryption key, the cryptographic engine is to execute key derivation logic.

8. The system of claim 6, wherein the processor core is further to:
 execute microcode to generate the second encryption key; and
 transmit the second encryption key to the cryptographic engine.

9. The system of claim 6, wherein the first register comprises an encryption activate register.

10. The system of claim 6, wherein the second register comprises a debug interface register.

11. The system of claim 6, wherein the cryptographic engine comprises a total memory encryption (TME).

12. The system of claim 6, wherein the cryptographic engine comprises, in part, a memory encryption engine (MEE).

13. A method comprising:
 upon reboot of a computing system, determining, by a processor core, that a memory encryption mode is enabled, wherein the memory encryption mode causes data stored to memory to be encrypted and data retrieved from the memory to be decrypted;
 determining, by the processor core, that a non-privileged memory debug mode has been enabled; and
 responsive to determining that the non-privileged memory debug mode has been enabled:
  generating, by the processor core, a second encryption key different than a first encryption key employed before the reboot of the computing system, wherein use of the first encryption key will fail to access data stored in memory, wherein to generate the second encryption key, the processor core is to cause a deterministic tweak in key generation, and providing, by the processor core, the second encryption key to a cryptographic engine for use in encrypting and decrypting the data according to the memory encryption mode.

14. The method of claim 13, wherein generating the second encryption key comprises the processor core executing a set of microinstructions.

15. The method of claim 13, wherein determining that the memory encryption mode is enabled comprises reading a bit stored in an encryption activate register.

16. The method of claim 13, wherein determining that the non-privileged memory debug mode is enabled comprises reading a bit from a debug interface register.

17. The method of claim 13, wherein the cryptographic engine comprises one of a total memory encryption (TME) engine or a memory encryption engine (MEE).

* * * * *